United States Patent [19]

Zollinger

[11] Patent Number: 4,865,082

[45] Date of Patent: Sep. 12, 1989

[54] PACING MOTION FOR A TEXTILE MACHINE

[75] Inventor: Hans Zollinger, Tann Ruti, Switzerland

[73] Assignee: Sulzer Brothers Limited, Winterthur, Switzerland

[21] Appl. No.: 185,471

[22] Filed: Apr. 22, 1988

[30] Foreign Application Priority Data

May 19, 1987 [CH] Switzerland ............. 01920/87

[51] Int. Cl.$^4$ ........................... D03D 49/20
[52] U.S. Cl. ........................................ 139/309
[58] Field of Search .................. 464/1, 160; 139/1 R, 139/66 R, 76, 304, 309

[56] References Cited

U.S. PATENT DOCUMENTS 4,427,035 1/1984 Hintsch et al. ................. 139/76
4,552,184 11/1985 Kleiner ........................ 139/66 R
4,569,374 2/1986 Juillard ........................ 139/309

Primary Examiner—Henry S. Jaudon
Attorney, Agent, or Firm—Kenyon & Kenyon

[57] ABSTRACT

The pacing motion which is adapted to be stepped on in respect of individual wefts has a sliding wedge with a return spring. The wedge is displaceable on an output shaft into a groove of an input shaft in both directions of rotation. The motion also includes a locking lever actuatable off-load by a control signal. The lever locks and unlocks a release lever which is driven by a drive element and actuates the wedge. A transmission with a delay feature or a resilient damping insert can be used as an impact-reducing element to absorb some of the impact of the wedge in the groove. Freely actuatable electromagnets can be used both as actuating elements and as the drive element.

20 Claims, 5 Drawing Sheets

PACING MOTION FOR A TEXTILE MACHINE

This invention relates to a take-up motion for a textile machine. More particularly, this invention relates to a take-up motion for a loom.

As is known, textile machines, such as looms, have a take-up motion by means of which finished cloth or fabric is wound onto a cloth beam. Generally, the take-up motions operate so as to maintain a fixed rate of feed which is adapted to the cloth. Consequently, an accurately defined and continuous rate of feed is required if cloth of high quality is to be produced.

If any required compression or compacting pattern is to be achieved in the cloth, it must be possible for the take-off of the cloth to be interrupted or delayed at a required and freely selectable rhythm. Different cloth compressions of this kind can be produced to a very limited extent by means of changeover ratchet wheel sets, for example, as disclosed in U.S. Pat. No. 3 837 368 wherein a number of ratchet wheel sets having different tooth numbers are provided and can be engaged alternately as transmission drives of the take-up motion. However, since there is space for only a few such sets, for example, four sets, in a loom, the number of different cloth compressions—i.e., feed rates—which can be provided is very limited. For example, at each pick, the ratchet wheel and, thus, the cloth take-off is rotated by one further tooth. This slow rate of feed can be interrupted so that pacing is blocked by an additional facility. This simple principle of slow-running ratchet wheels can operate accurately for individual wefts but cannot meet the requirements in high-performance looms for higher-quality cloth of a continuous rate of advance and automatic return by the loom drive.

A return produced by cloth tension, which depends very considerably upon the cloth, is unsatisfactory. A return movement extending over an accurately defined number of steps must be produced automatically. To meet these requirements, take-up motions were developed which had change-speed geared reductions and, more particularly, a pacing ratchet which rotates at loom speed—i.e., one revolution per pick—and which can therefore be stepped very accurately. The take-up or stepping motion is sensed by a pawl on an output shaft, the pawl engaging in and disengaging from a recess connected to the input shaft, such recess being in a disc. However, even this improved take-up motion cannot deal satisfactorily with the increasing requirements of high-speed machines. Further, severe impacting of the pawl in the groove causes heavy wear and breakages of the stressed parts. At speeds above about 350 rpm, take-up usually becomes dubious. The limited force of the mechanical actuating signal for actuating the take-up motion or take-up ratchet represents another serious problem. This force is often inadequate for stepping on, for example in jacquard machines.

Accordingly, it is an object of the invention to provide a take-up motion with a freely selectable rhythm of a take-up lock for any desired fabric compression.

It is another object of the invention to provide a take-up motion which is able to operate reliably and accurately and which can be actuated by means of freely programmable electrical signals.

It is another object of the invention to provide a take-up motion which is able to operate reliably and accurately at high speeds.

It is another object of the invention to provide a take-up motion which can be actuated by means of freely programmable electric signals.

It is another object of the invention to provide a take-up motion of relatively simple construction which operates under reduced stressing.

Briefly, the invention provides a loom take-up motion for a textile machine which comprises a rotatable input shaft having a groove, a rotatable output shaft aligned with the input shaft and a wedge mounted on the output shaft for movement between a first position in the groove of the input shaft in order to engage the shafts and a second position out of the groove in order to disengage the shafts.

A spring means is also provided for biasing the wedge from the position which is out of the groove towards the position in the groove.

The wedge is also mounted on a slider which, in turn, is mounted coaxially of the output shaft for rotation therewith and which is diametrically slidable relative to the output shaft.

The loom take-up motion also has a control means for selectively controlling movement of the wedge between the two positions relative to the groove. For example, the control means includes a release lever for moving the wedge from the engaged position to the disengaged position while the release lever is in an actuating position. The control means also has a drive means for moving the release lever from a rest position to the actuating position. Still further, the control means includes a locking means for releasably locking the release lever in the rest position.

The loom take-up motion also has an impact-reducing element for reducing the impact of the wedge in the groove during reengagement of the wedge in the groove.

The required accuracy of stepping is provided in the loom take-up motion by the wedge and groove. The locking means which is actuatable off load by a control signal enables weak signals to be used for stepping-on whether they are the mechanical signals of jacquard cords or any desired sequence of electrical signals. The required actuating energy is provided by the drive means. To a substantial and operationally decisive extent, the high energy of impact which occurs when the loom take-up motion reengages is intercepted or reduced by the impact-reducing element.

The impact-reducing element can take the form of a transmission with a delay feature so as to provide a speed reduction of preferably from 30% to 40% during each rotation of the input shaft. This basically permits a corresponding increase in machine speed. The same effect can be achieved with a resilient damping insert disposed between the wedge and the output shaft. Resilient polyurethane having a Shore A-hardness of from 90 to 100 may be particularly suitable as such a damping insert.

Advantageously, a cam and a cam roller lever can be provided as a reliable and rugged drive means. Alternatively, a freely actuatable electromagnet can be used since the necessary accurate timing of the pacing motion is ensured by the mechanical elements. However, if, for example, an electromagnetic clutch were to be used directly as a pacing element, it would be impossible to achieve accurate pacing, with clearly visible adverse effects on cloth quality and uniformity. Basically, the loom take-up motion combines the accuracy of mechanical positive pacing with the versatile control possibilities of electronic signals. To achieve this, the locking means can be actuated by a freely actuatable electromagnet which, in turn, is actuated by an electrical control signal transmitter.

High operating reliability and a long working life in connection with re-engagement in the forward direction can be achieved by the wedge and groove being devised in dependence upon direction, thus, the contact area between the wedge and the groove may be several times greater, for example, from three to five times greater, in the forward direction than the contact area in the background direction. In this case, the smaller contact area for the backward direction is sufficient for actuation and leaves additional space free for optimum engagement of the wedge at very high speeds. Operating reliability can be further increased by an adjustable brake operative on the output shaft and having a stop location for the wedge.

These and other objects and advantages of the invention will become more apparent from the following detailed description taken in conjunction with the accompanying drawings wherein.

Figure 1:
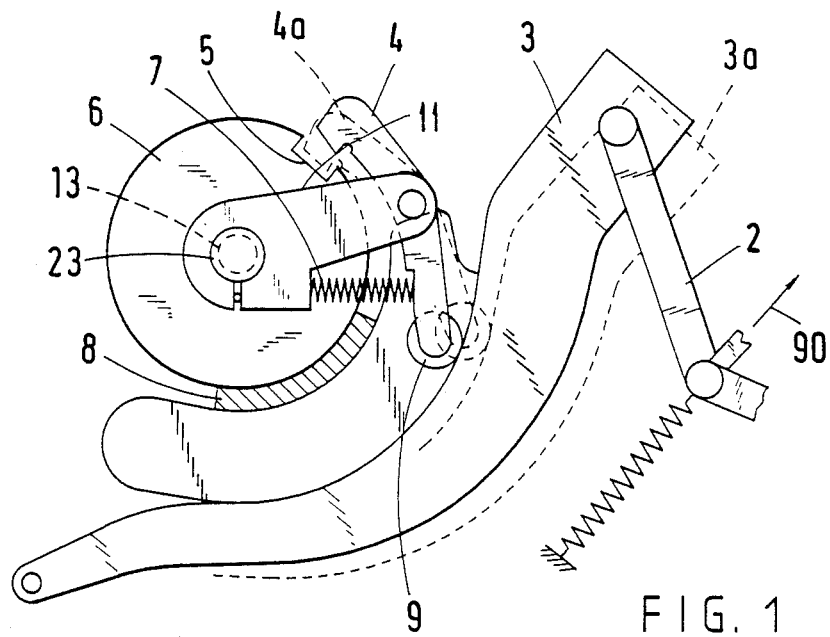
FIG. 1 illustrates a loom take-up motion ratchet in accordance with the prior art.

Referring to FIG. 1, the known loom take-up ratchet includes a rotatable input shaft 13 which is connected to a disk 6 and an output shaft 23. In addition, a rotatably mounted pawl 4 is mounted on a support 11 which is connected to the output shaft 23 and is biased by a compression spring 7 towards a recess or groove 5 in the periphery of the disk 6. When the pawl 4 is in an engaged state as indicated by the dotted line position 4a, the pawl 4 is driven by the disk 6. The input shaft 13 is then rigidly connected to the output shaft 23 which, for example by way of a chain drive, drives a loom take-up motion (not shown). As indicated, the pawl 4 carries a roller 9 at one end to engage a pivotally mounted lever 3.

The lever 3 is movable between an engaged position as shown in solid line and a disengaged position 3a as shown in dotted line by means of a linkage 2.

When, for example, a shedding motion (not shown) transmits a mechanical actuating signal 90 or applies a force to the linkage 2, the camming lever 3 moves from the engaged position 3a to the disengaged position 3. During the next rotation of the input shaft 13, the roller 9 of the pawl 4 runs onto the cam of the lever 3 and pivots the pawl from the position 4a into the position 4 so that the pawl disengages from the recess 5. A sprung brake 8 on the lever 3 contacts the disk 6 and stops the disk 6 suddenly so that cloth take-off is interrupted.

When the lever 3 returns to the engaged position 3a, the pawl 4 moves across the surface of the disk 6 and snaps at full speed of rotation into the recess 5 of the disk in order to drive the disk abruptly. Due to the severe impact, the part of the pawl 4 engaging with the recess 5 as well as the recess 5 wear rapidly even at moderate speeds so that accurate drive becomes impossible. Further, the spring 7 may break. Still further, the take-up ratchet cannot provide the required ratchet action at high loom speeds above about 350 rpm.

Figure 2:
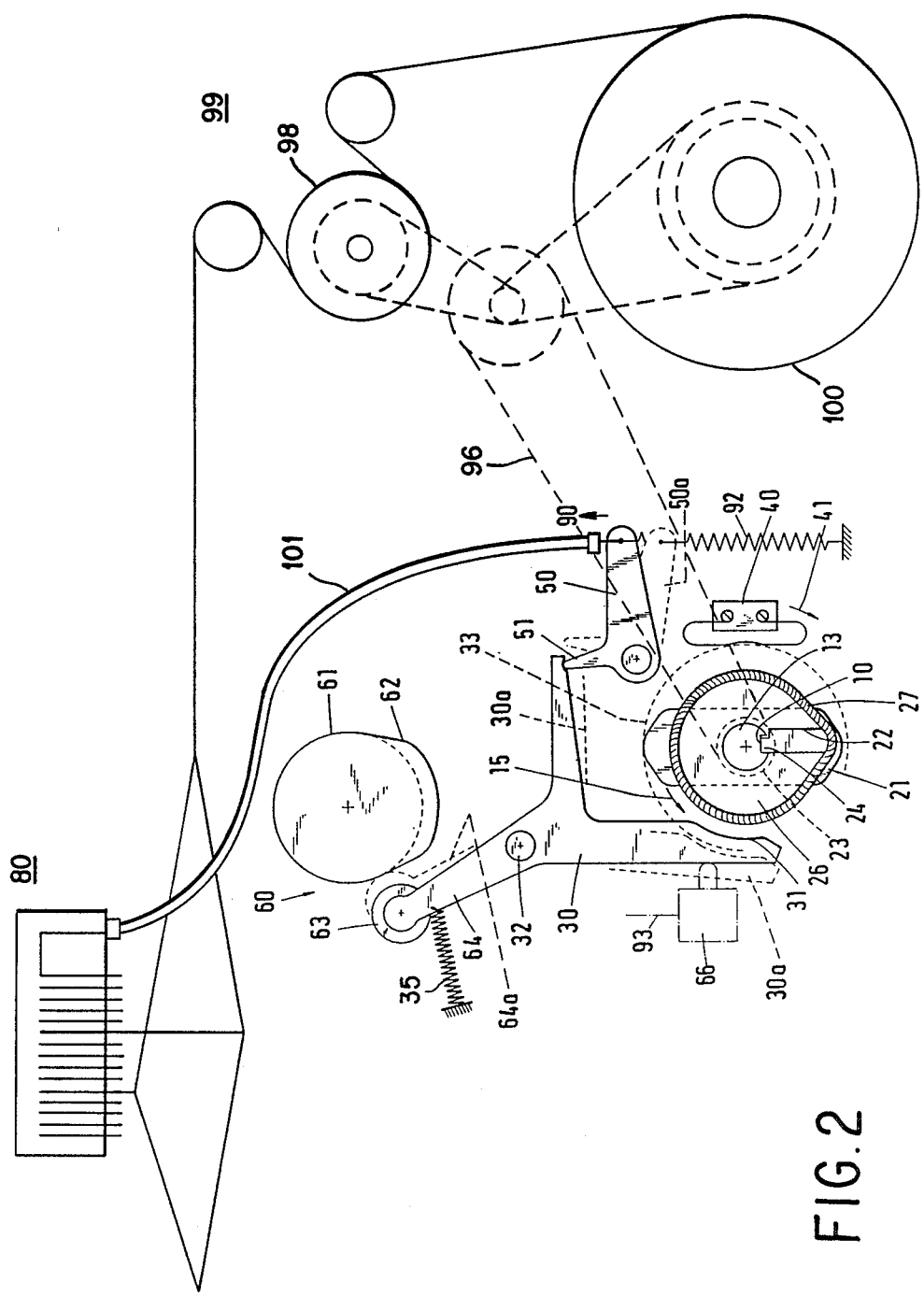
FIG. 2 illustrates a loom take-up motion constructed in accordance with the invention.

Referring to FIG. 2, the loom take-up motion 10-60 of the invention is actuated by a control signal which is transmitted from a shedding motion 80 of a loom. This signal may be a mechanical signal 90, for example, from a shedding motion 80 delivered via a cable 101 or from a Jacquard machine, or an electrical signal 91 output from a program control 81 (see FIG. 6) coordinated with shedding. As indicated in FIG. 2, the mechanical and electrical power drives (from the loom drive and from the electrical supply mains) are changed over in a stepped output (chain drive) 96 by the take-up motion in accordance with the signal 90, 91. The chain drive 96, in turn, drives a stepping beam 98 of a cloth take-up 99.

The control signal 90, 91 can determine, for each individual pick, whether or not the take-up motion is to be stepped on by a step which is determined by reduction gearing (not shown) and which corresponds to exactly 360° rotation of the loom main shaft (complete blocking, zero degree rotation). This accurate loom take-up motion which is independent, for example, of cloth tension, is achieved as described below.

Figure 4:
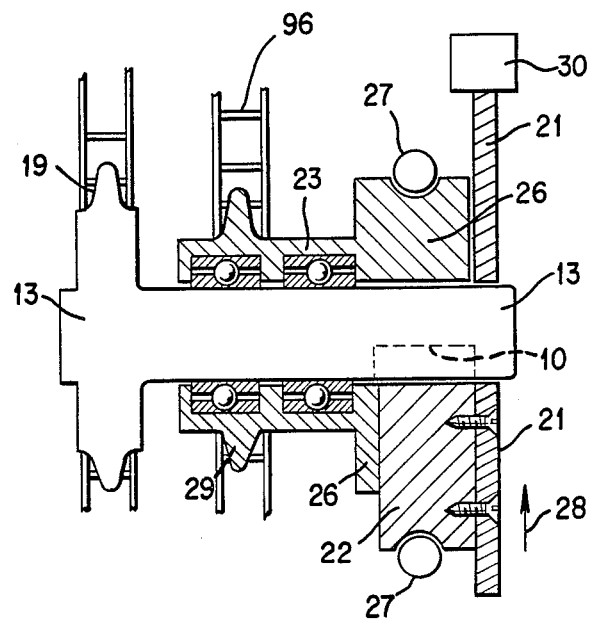
FIG. 4 illustrates a cross sectional view of the main components of the loom take-up motion in accordance with the invention.

As illustrated in FIGS. 2 and 4, the loom take-up motion for the loom includes a rotatable input shaft 13 having a groove 10, for example, the groove may be provided by a separate element fixed to the input shaft 13. In addition, a rotatable output shaft 23 is aligned with the input shaft 13. These shafts 13, 23 function in generally known manner and need not be further described.

The take-up motion also includes a slider 21 which is mounted coaxially of the output shaft 23 for rotation therewith while being diametrically slidable relative to the output shaft 23. Any suitable connection (not shown) may be made between the slider 21 and the shaft 23 for these purposes. In addition, a wedge 22 is mounted on the slider 21 for movement therewith in order to move between a first engaged position in the groove 10 in order to engage the shafts 13, 23 and a second disengaged position out of the groove in order to disengage the shafts 13, 23 (see FIG. 3). In this respect, the wedge 22 has a projection 24 for engaging within the groove 10.

Figure 9:
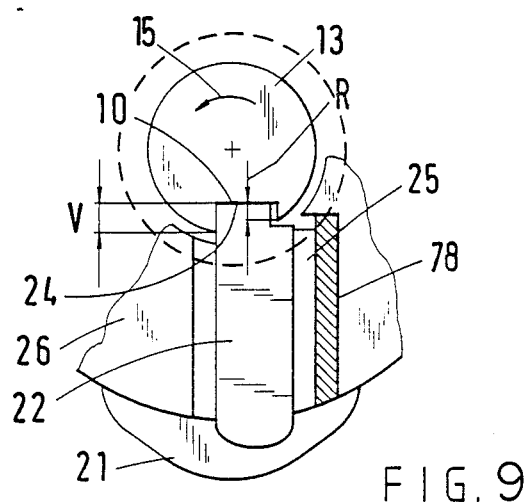
FIG. 9 illustrates a view of a modified impact-damping element relative to a movable wedge in accordance with the invention.

A disk 26 is mounted coaxially of and is secured to the output shaft 23 and has a slot (as indicated in FIG. 9) within which the wedge 22 may slide in a relative sense. In addition, a spring means in the form of an endless spring 27 is placed around the disk 26 for biasing the wedge 22 from the disengaged position (see FIG. 3) towards the engaged position (see FIG. 2).

The take-up motion also has a control means for selectively controlling movement of the wedge 22 between the engaged and disengaged positions. This control means includes a release lever 30 which is pivotally mounted on a suitable pivot 32. The lever 30 includes a pair of arms for moving between a rest position 30a shown in dotted lines and an actuating position as shown in FIG. 2. The control means also have a locking means 50 in the form of a pivotally mounted lever 50 for releasably locking the release lever 30 in the actuating position by means of an arm 51.

As indicated, the lever 50 is movable against the bias of a spring 92 by means of a mechanical signal 90, for example in the form of a pull of a shedding motion 80.

The control means also includes a drive means 60 for moving the release lever 30 from the rest position to the actuating position. As indicated, the drive means 60 may include a rotatable cam 61 having a cam surface 62 for engaging a cam roller 63 on a third arm 64 of the release lever 30. This cam 61 runs synchronously with the input shaft 13 while the arm 64 is biased by a spring 35 into the rest position 64a.

Figure 5:
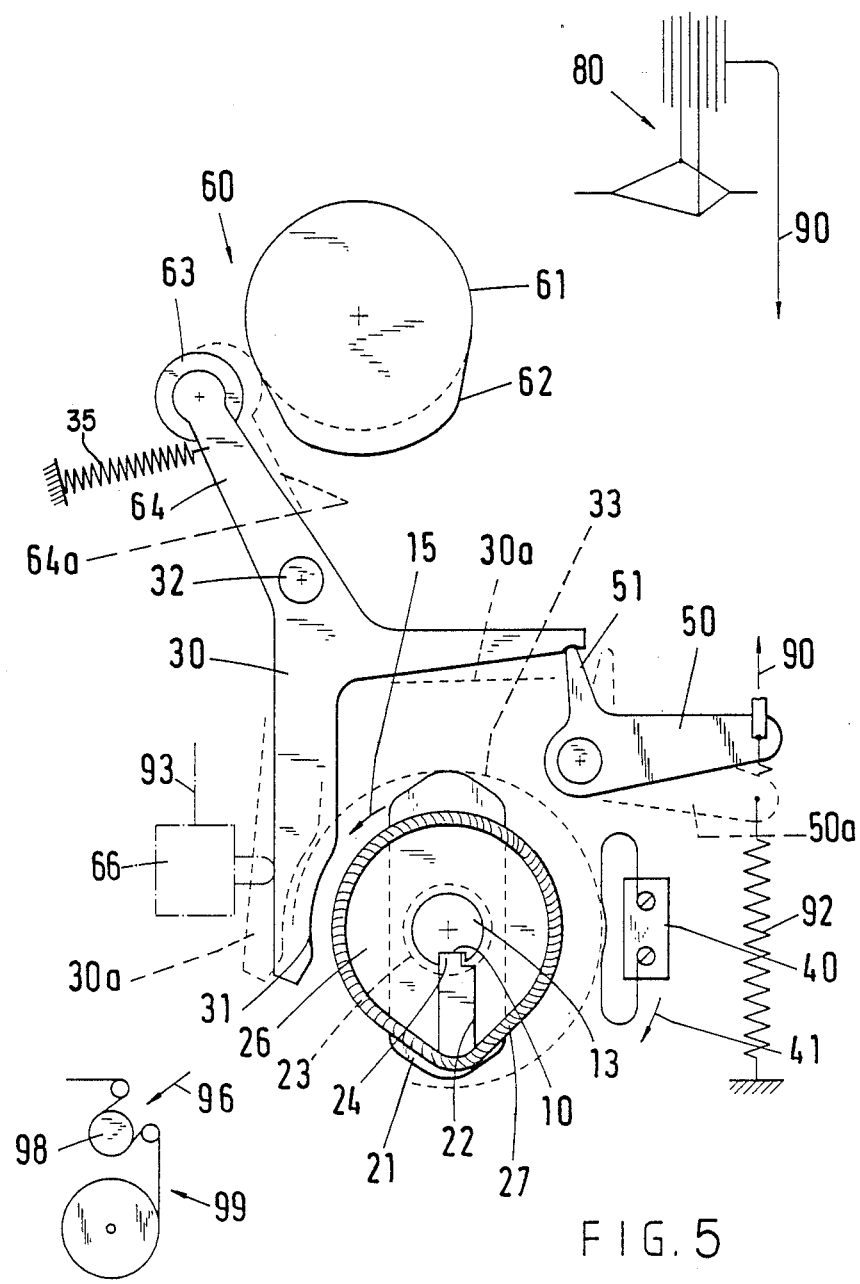
FIG. 5 illustrates a modified loom take-up motion employing an electromagnetic drive means.

Alternatively, as indicated in FIG. 5, wherein like reference characters indicate like parts as above, the drive means may be in the form of a freely actuatable electromagnet 66 which is actuated via a signal line 93 by means of, for example, a programmed produced electrical signal. As indicated, the electromagnet has a reciprocably mounted pin for engaging the release lever 30 so as to move the lever 30 from the rest position to the actuating position.

An adjustable brake 40 is also disposed opposite the release lever 30 relative to the slider 21 for engaging the w slider 21 to brake the output shaft 23.

Figure 3:
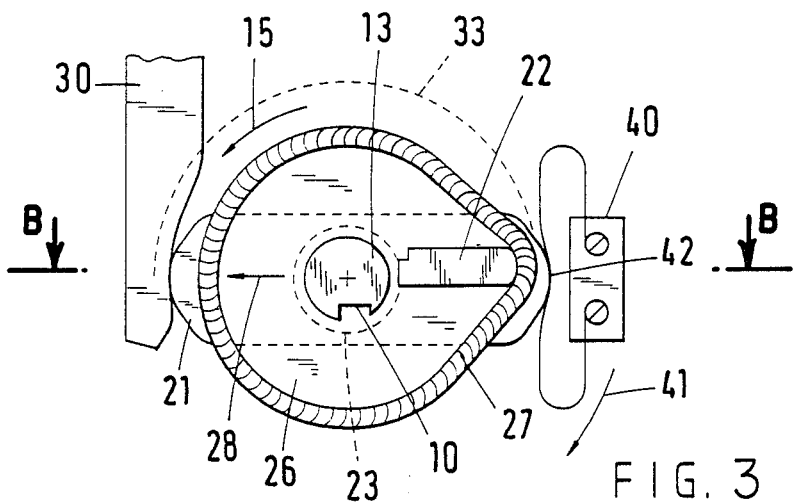
FIG. 3 illustrates a view of a slider and wedge in a braked disengaged position in accordance with the invention.

During operation, a mechanical signal 90 from the shedding motion 80 moves against the force of the spring 92 to pivot the locking lever 50 in a counterclockwise manner into the solid line position shown in FIG. 2. At this time, the lever 50 is in position to lock the release lever 30 in the actuating position. As the output shaft 23 is rotating, the slider 21 is carried along in the direction indicated by the arrow 15 and within a path 33 of rotation. As the slider 21 comes into contact with the lever 30, the slider 21 engages a curved cam surface 31 on the lever 30. Continued rotation of the output shaft 23 causes the slider 21 to move diametrically relative to the output shaft 23 so as to disengage the wedge 22 from the groove 10 in the input shaft 13. At the same time, the opposite end of the slider 21 is pressed against the stationary brake 40 and rapidly brought to a stop, for example at a stop location 42 defined by a curves surface of the brake 40. As illustrated in FIG. 3, the brake 40 is adjustable in the direction indicated by the arrow 41 so that the end of the slider 21 can be stopped in a definite and reproducable manner.

After disengagement of the wedge 22, the input shaft 13 continues to rotate freely but the movement of the output shaft 23 and disc 26 and, therefore, cloth take-up remain interrupted until the release level 30 is moved via the spring 35 into the rest position 30a illustrated in FIG. 2.

As indicated in FIG. 3, the spring 37 biases the wedge 22 and slider 21 in the direction indicated by the arrow 28 so that during the next revolution of the input shaft 13, the wedge 22 reengages completely in the groove 10, provided the lever 30 has been displaced back to the rest position 30a.

In order to return the release lever 30 to the rest position, the locking lever 50 is pivoted in a clockwise manner into the initial position 50a by means of the spring 92 and in the absence of a signal 90. With the lever 50 in this position, the release lever 30 is free to return to the rest position under the bias of the spring 35 without interfering with the spring-biased action of the spring 27 on the wedge 22. In this respect, as the cam 61 rotates, the release lever 30 is so positioned that the cam surface 31 misses the slider 21 as the slider passes by.

Figure 6:
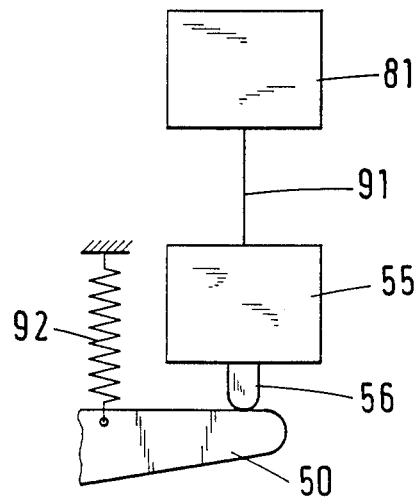
FIG. 6 illustrates an electronic actuating means for actuating a locking means of the loom take-up motion in accordance with the invention.

Referring to FIG. 6 instead of using a mechanical signal or pull 90, an electrical signal 91 can be produced by the program control 81 for actuating a relatively small electromagnet 55. Thus, by way of a moving part 56 of the electromagnet 55, the locking lever 50 may be actuated. In this respect, actuating forces of, for example, only 5 to 10N are completely satisfactory. Also, instead of the cam 61, an electromagnet 66 may be used for driving the release lever 30.

Figure 8:
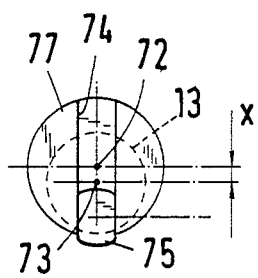
FIG. 8 illustrates a view taken on line C—C of FIG. 7.
Figure 7:
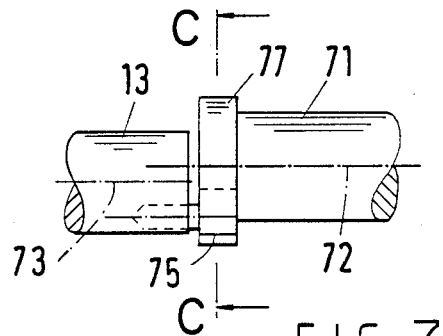
FIG. 7 illustrates a side view of a transmission having a delay characteristic constructed for use as an impact-reducing element in accordance with the invention.

Referring to FIGS. 7 and 8, an impact-reducing element may be provided for reducing the impact of the wedge in the groove during re-engagement of the wedge in the groove. To this end, the impact-reducing element includes a transmission having a delay characteristic connected to the input shaft for reducing the speed of rotation of the input shaft during each revolution thereof. For example, the transmission is connected between a drive shaft 71 and the input shaft 13 and includes a pin 77 formed with a groove 74 in which a crankpin-like slide block 75 on the input shaft 13 engages. The respective axes 72, 73 of drive shaft 71 and input shaft 13 are offset eccentrically by a distance X. The slide block 75 and, therefore, the input shaft 13 are therefore compelled to perform a sinusoidally oscillating rotation. The amount of non-uniformity can be selected by means of the eccentricity X. Preferably, a speed reduction of from 30 to 40% at the lowest point of the speed relationship to the constant loom speed is selected. Engagement of the wedge 22 in the groove 10 (FIG. 2) is then shifted to this lowest point.

Referring to FIG. 9, the impact-reducing element may also be in the form of a resilient damping insert 78 which damps the impact experienced by the wedge 22 when engaging in the groove of the input shaft 13 which is rapidly rotating in a counterclockwise (forward) direction as viewed. The damping insert 78 is disposed in a recess of the disk 26 under a plain bearing 25 which serves to guide the wedge 22. Preferably, the insert 78 is made of dimensionally stable and age-resistant elastomers, such as polyurethanes having a Shore A-hardness of 90 to 100.

If the groove 10 and the projection 24 of the wedge 22 are adapted to one another in dependent upon the direction of rotation, the contact area stressing at re-engagement can remain very low even at very high speeds. To this end, the contact area in the forward direction 15 of the shaft 13 (height V) is several times greater, for example, from 3 to 5 times greater, than the contact area in the backward direction (height R) when the loom is moved backwards. Because of the reduced height R, the wedge 22 can, in its normal forward actuation, as indicated by the arrow 15, engage over a correspondingly enlarged range of rotation of the input shaft 13 i.e., more time is available for the wedge projection 24 to engage in the groove 10, something which is essential at high speeds. The reduced contact area (R) and the reduced range of rotation available are sufficient for the slow backward actuation.

The impact-reducing elements shown in FIGS. 3 and 4 greatly reduce, for example, by from 30% to 50% the impact which occurs when the wedge 22 engages in the groove 10. When the wedge 22 disengages, the brake 40 ensures rapid and accurately reproducable stoppage of the output shaft 23 and, therefore, of the rate of cloth advance on the roller 98.

Since the locking means, i.e., the lever 50, is adapted to be actuated off load, very weak electrical and mechanical signals can be used for basically any kind of pacing motion control.

The invention thus provides a loom take-up motion which is able to operate at relatively low stressing for controlling a stepping motion for cloth take-off in a loom.

Further, the invention provides a loom take-up motion which is of relatively simple construction while being programmable in various types of manners.

The invention also provides a loom take-up motion which permits accurately defined and reliable actuation or locking of the motion at any desirable rhythm at very high speeds.

What is claimed is:

1. A loom take-up motion for a textile machine comprising
    a rotatable input shaft having a groove;
    a rotatable output shaft aligned with said input shaft;
    a wedge mounted on said output shaft for movement between a first position in said groove of said input shaft to engage said shafts and a second position out of said groove to disengage said shafts;
    spring means for biasing said wedge from said second position towards said first position;
    a release lever for moving said wedge from said first position to said second position in an actuating position thereof;
    drive means for moving said release lever from a rest position to said actuating position;
    locking means for releasably locking said release lever in said actuating position; and
    an impact-reducing element for reducing the impact of said wedge in said groove during re-engagement of said wedge in said groove.

2. A loom take-up motion as set forth in claim 1 wherein said drive means includes a rotatable cam and a cam follower lever connected to said release lever and engageable with said cam follower.

3. A loom take-up motion as set forth in claim 1 wherein said drive means includes a freely actuatable electromagnet.

4. A loom take-up motion as set forth in claim 1 wherein said impact-reducing element includes a transmission having a delay characteristic connected to said input shaft for reducing the speed of rotation of said input shaft of from 30% to 40% during each revolution thereof.

5. A loom take-up motion as set forth in claim 1 wherein said impact-reducing element includes a resilient damping insert in said output shaft between said wedge and said output shaft.

6. A loom take-up motion as set forth in claim 5 wherein said insert is made of resilient polyurethane having a Shore A hardness of from 90 to 100.

7. A loom take-up motion as set forth in claim 1 wherein said locking means comprise a freely actuatable electromagnet.

8. A loom take-up motion as set forth in claim 1 wherein said groove has a first wall for engaging said wedge in a forward direction of rotation of said input shaft and a second wall for engaging said wedge in a backward direction of rotation of said input shaft, said first wall having a contact area with said wedge of from three to five times greater than said second wall.

9. A loom take-up motion as set forth in claim 1 which further comprises an adjustable brake for braking said output shaft and having a stop location for positioning of said wedge therein.

10. A loom take-up motion for a loom comprising
    a rotatable input shaft having a groove;
    a rotatable output shaft aligned with said input shaft;
    a slider mounted coaxially of said output shaft for rotation therewith and being diametrically slidable relative to said output shaft;
    a wedge mounted on said slider for movement between a first position in said groove to engage said shafts and a second position out of said groove to disengage said shafts;
    spring means for biasing said wedge from said second position towards said first position; and
    control means for selectively controlling movement of said wedge between said positions.

11. A loom take-up motion as set forth in claim 10 wherein said control means includes a release lever for moving said slider diametrically of said output shaft to move said wedge from said first position to said second position.

12. A loom take-up motion as set forth in claim 11 which further comprises an adjustable brake opposite said release lever for engaging said slider to brake said output shaft.

13. A loom take-up motion as set forth in claim 11 wherein said control means further includes a drive means for moving said release lever from a rest position to an actuating position for engagement with said slider.

14. A loom take-up motion as set forth in claim 13 wherein said drive means is an electromagnet.

15. A loom take-up motion as set forth in claim 13 wherein said control means further includes locking means for releasably locking said release lever in said actuating position.

16. A loom take-up motion as set forth in claim 10 which further comprises an impact-reducing element for reducing the impact of said wedge in said groove during re-engagement of said wedge in said groove.

17. A loom take-up motion as set forth in claim 16 wherein said impact-reducing element includes a transmission having a delay characteristic connected to said input shaft for reducing the speed of rotation of said input shaft of from 30% to 40% during each revolution thereof.

18. A loom take-up motion as set forth in claim 16 wherein said impact-reducing element includes a resilient damping insert in said output shaft between said wedge and said output shaft.

19. A loom take-up motion as set forth in claim 10 wherein said groove has a first wall for engaging said wedge in a forward direction of rotation of said input shaft and a second wall for engaging said wedge in a backward direction of rotation of said input shaft, said first wall having a contact area with said wedge of from three to five times greater than said second wall.

20. A loom take-up motion as set forth in claim 10 wherein said spring means includes an endless spring about said wedge.

* * * * *

UNITED STATES PATENT AND TRADEMARK OFFICE
CERTIFICATE OF CORRECTION

PATENT NO. : 4,865,082

DATED : Sept. 12, 1989

INVENTOR(S) : HANS ZOLLINGER

It is certified that error appears in the above-identified patent and that said Letters Patent is hereby corrected as shown below:

```
Column 5, line 29 "w slider" should be -slider-
Column 5, line 47 "curves" should be -curved-
Column 5, line 55 "level" should be -lever-
Column 6, line 39 "groove" should be -groove 10-
Column 6, line 48 "dependent" should be -dependence-
```

Signed and Sealed this

Twenty-first Day of August, 1990

Attest:

HARRY F. MANBECK, JR.

*Attesting Officer*   Commissioner of Patents and Trademarks